United States Patent [19]

Visenzi

[11] Patent Number: 5,351,509
[45] Date of Patent: Oct. 4, 1994

[54] DEVICE FOR CLOSING AND COUPLING LUGGAGE AND THE LIKE, PARTICULARLY FOR MOTORCYCLES

[76] Inventor: Guiseppe Visenzi, Viale della Bornata, 117, 25100 Brescia, Italy

[21] Appl. No.: 979,695

[22] Filed: Nov. 20, 1992

[51] Int. Cl.$^5$ .............................................. E05B 65/48
[52] U.S. Cl. .................................... 70/73; 70/159
[58] Field of Search ................................ 70/69–75, 70/158–162, 14, 18, 19

[56] References Cited

U.S. PATENT DOCUMENTS

| | | | |
|---|---|---|---|
| 3,698,753 | 10/1972 | Atkinson | 70/73 X |
| 4,468,940 | 9/1984 | Davis | 70/159 X |
| 4,782,673 | 11/1988 | Castelli et al. | 70/72 |
| 4,996,855 | 3/1991 | Havenga et al. | 70/14 |
| 5,060,492 | 10/1991 | Carpenter et al. | 70/73 |
| 5,111,918 | 5/1992 | Bako et al. | 70/73 X |
| 5,216,905 | 6/1993 | Sersch et al. | 70/73 |
| 5,235,830 | 8/1993 | Benge | 70/71 X |

FOREIGN PATENT DOCUMENTS 0370368 5/1990 European Pat. Off. .
3716445 11/1988 Fed. Rep. of Germany .
473171 7/1952 Italy ............................. 70/158

*Primary Examiner*—Peter M. Cuomo
*Assistant Examiner*—Suzanne L. Dino
*Attorney, Agent, or Firm*—Guido Modiano; Albert Josif; Daniel O'Byrne

[57] ABSTRACT

Device for closing and coupling carryall cases having a shell and a counter-shell which are mutually hinged, the shell being provided with brackets for coupling to racks of a motorcycle. The device has a shaped plate fixed inside an accommodation seat defined within the shell. The shaped plate has first pivoting lugs for linkages which define a first pivoting axis for lever systems for coupling to the counter-shell and a second pivoting axis for a locking plate. The shaped plate has second pivoting lugs for a handle of the case, and the locking plate is provided with a lock and bolt mechanism for closing the device and with an opening for permitting uncoupling of the carryall case from a motorcycle. A snap-action release button connects the linkages to the first pivoting lugs and connects the handle to the second pivoting lugs. The handle has a cross-member which, in closed position, is interposed between the lever systems and the locking plate.

20 Claims, 3 Drawing Sheets

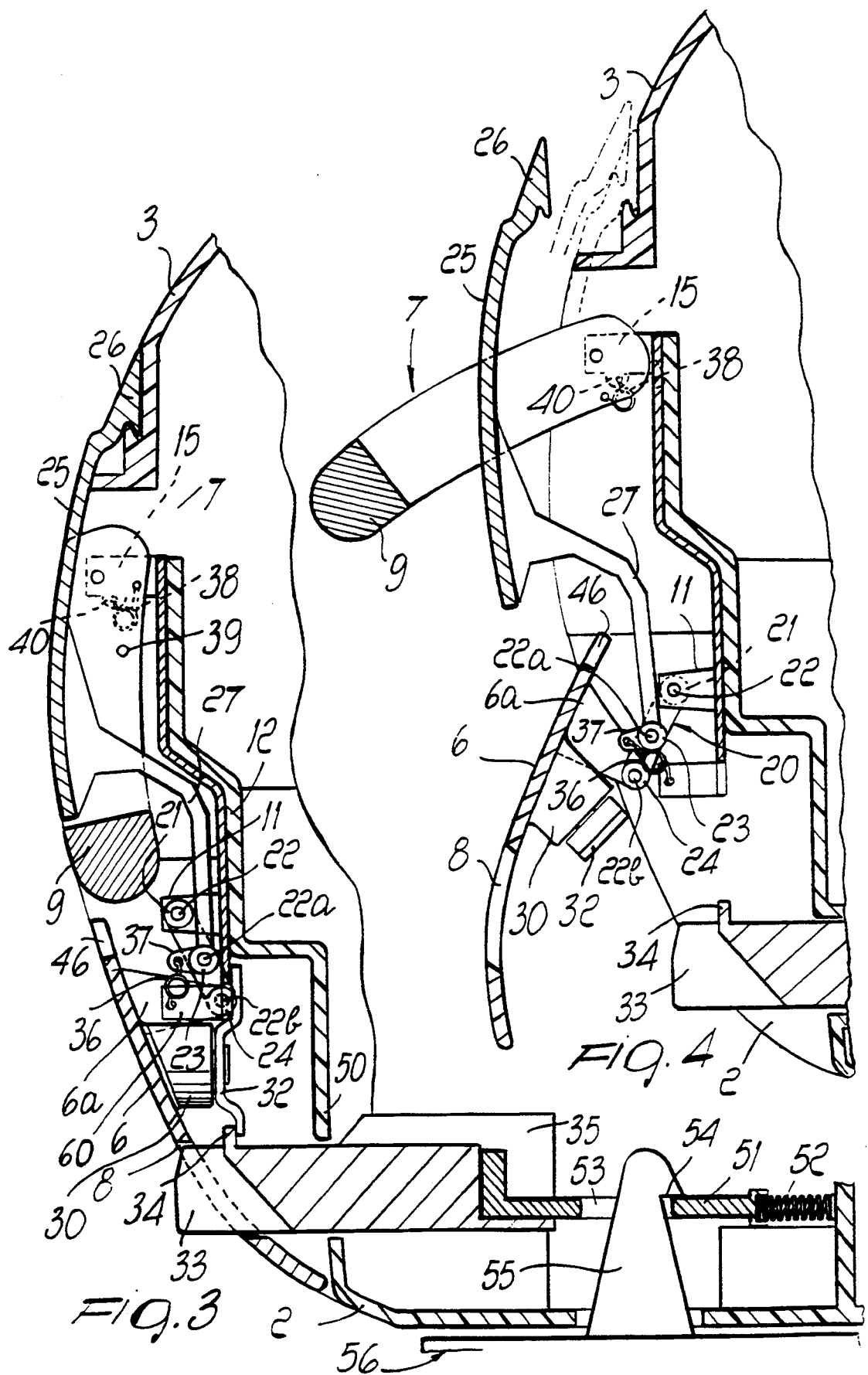

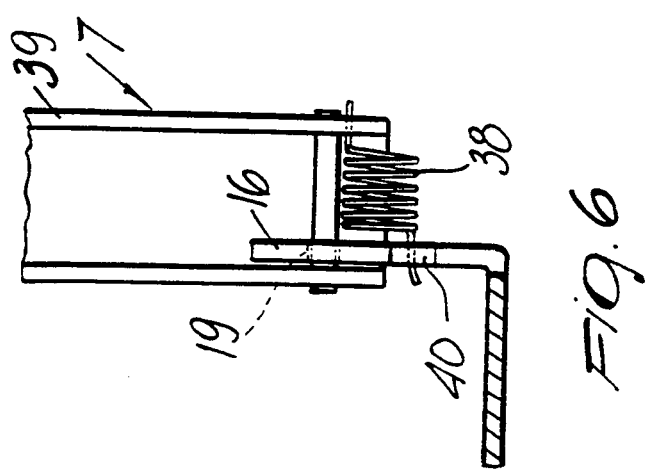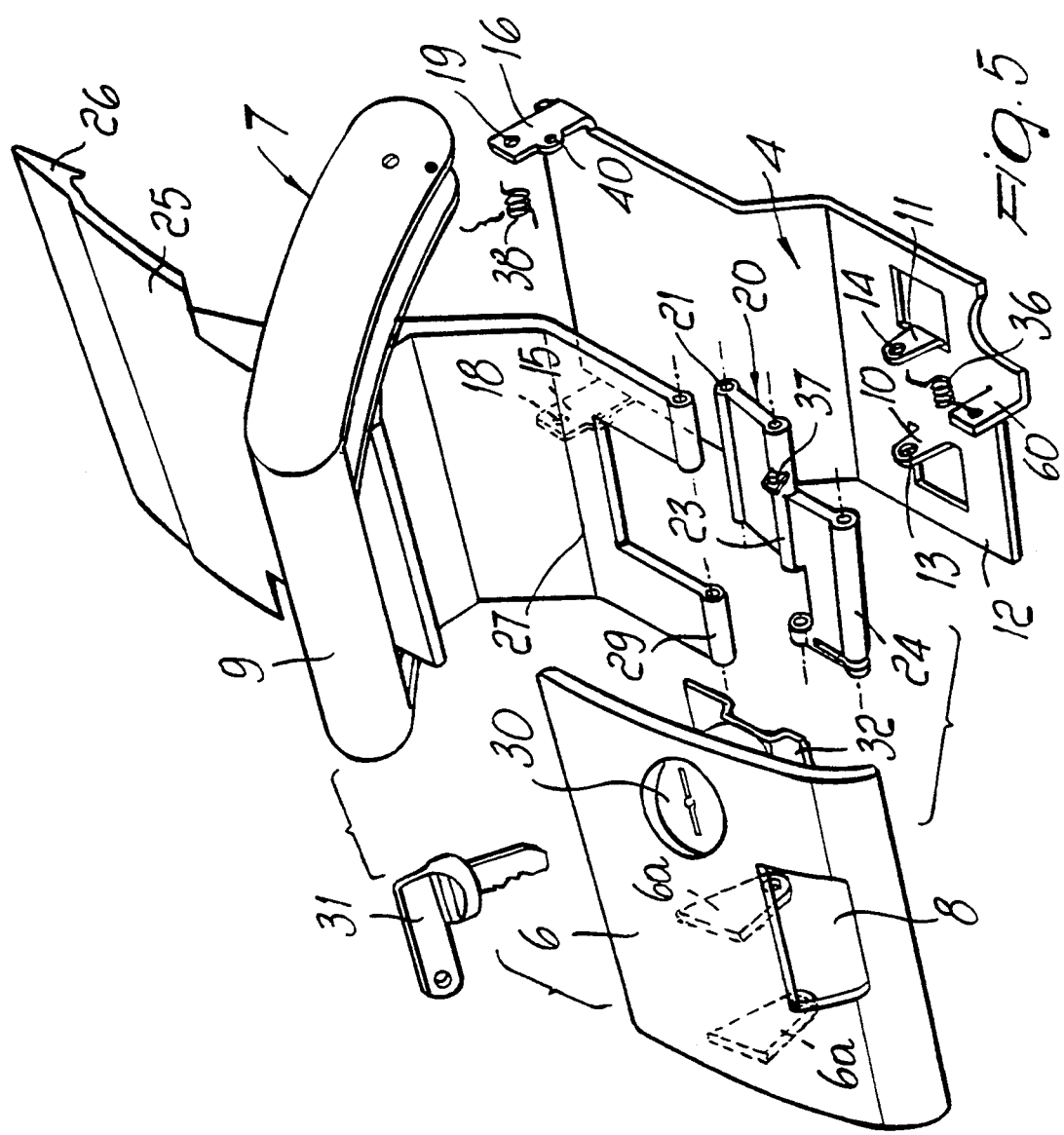

DEVICE FOR CLOSING AND COUPLING LUGGAGE AND THE LIKE, PARTICULARLY FOR MOTORCYCLES

BACKGROUND OF THE INVENTION

The present invention relates to a device for closing and coupling luggage and the like, particularly for motorcycles.

Recently it has become popular to apply on the rear rack of motorcycles, both low- and high-powered ones, luggage or rigid bags which are applied by means of bracket-like elements provided on the case to engage coupling pins provided on the racks.

Such luggage are disclosed in prior patents in the name of the same Applicant, such as for example Italian patents 1,154,627 and no. 201,809, which are assumed included herein as reference.

The greatest problems of current motorcycle luggage, such as carryall cases, bags etc. are linked to two factors; namely, first of all the need to prevent theft of the cases or rigid bags, and secondly the need to provide easy opening of the case, combined with easy uncoupling of the case from the motorcycle, obviously by the user who owns a related opening key.

Furthermore, due to reasons which are also linked to the streamline of the motorcycle, it is important to eliminate the fixed external handle of the case, which currently protrudes from the body of most carryall cases or rigid bags installed on motorcycles.

SUMMARY OF THE INVENTION

The aim of the present invention is to eliminate or substantially reduce the disadvantages described above in known types of cases for motorcycles by providing a device for closing and coupling cases and the like, particularly for motorcycles, which allows to retract the grip handle into the shape of the case or bag.

Within the scope of the above aim, an object of the present invention is to provide a closure and coupling device which allows the user to easily open the case.

Another object of the present invention is to provide a closure and coupling device which allows the user to easily remove the carryall case or rigid bag from the motorcycle.

Not least object of the present invention is to provide a closure and coupling device for carryall cases and the like which is highly reliable, relatively easy to manufacture and at competitive costs.

This aim, the objects mentioned and others which will become apparent hereinafter are achieved by a device for closing and coupling carryall cases and the like, particularly for motorcycles, comprising a shell and a counter-shell of a case which are mutually hinged, said shell being provided with brackets for coupling to racks of a motorcycle, characterized in that it comprises a shaped plate fixed inside an accommodation seat defined within said shell, said shaped plate supporting first pivoting means for linkages defining a first pivoting axis for lever systems for coupling to said counter-shell and a second pivoting axis for a locking plate, said shaped plate being provided with second pivoting means for a handle of said carryall case, said locking plate being provided with means for closing said device and with an opening for means for uncoupling said carryall case from said motorcycle, release means connecting said linkages to said first pivoting means and said handle to said second pivoting means, said handle having a cross-member which, in closed position, is interposed between said lever systems and said locking plate.

BRIEF DESCRIPTION OF THE DRAWINGS

Further characteristics and advantages of the invention will become apparent from the description of a preferred but not exclusive embodiment of a device for closing and coupling carryall cases and the like particularly for motorcycles, according to the invention, illustrated only by way of non-limitative example in the accompanying drawings, wherein:

FIG. 3 is a sectional view of the closure and coupling device according to the invention, in closed position;

FIG. 4 is a sectional view of the closure and coupling device according to the invention, in open position;

FIG. 5 is an exploded perspective view of the closure and coupling device according to the invention; and FIG. 6 is an enlarged detail view of a handle of the carryall case.

DESCRIPTION OF THE PREFERRED EMBODIMENTS

Figure 1:
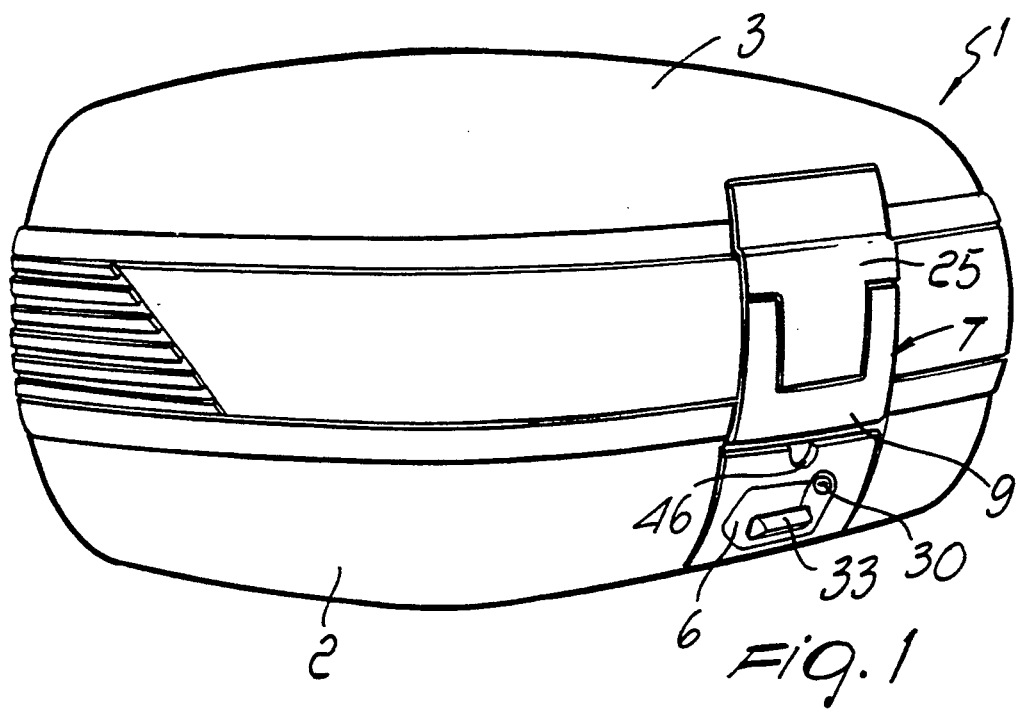
FIG. 1 is a perspective view of a carryall case in closed position.

With reference to the above figures, a carryall case or rigid bag 1 for motorcycles has a shell 2 and a counter-shell or lid 3 which are hinged together. The shell 2 has brackets, not shown, for coupling to racks of a motorcycle which are not illustrated.

A device for closing and coupling carryall cases and the like, particularly for motorcycles, comprises a shaped plate 4 fixed within an accommodation seat 5 defined within the shell 2.

The shaped plate 4 has first pivoting means for linkages which define a first pivoting axis for lever systems for coupling to the counter-shell 3 and a second pivoting axis for a locking plate 6.

The shaped plate 4 is furthermore provided with second pivoting means for a handle 7 of the carryall case 1, and the locking plate 6 is provided with means for closing the device according to the invention and with an opening 8 for means for uncoupling the case 1 from the rack of the motorcycle.

Snap-action release means connect the linkages to the first pivoting means and connect the handle 7 to the second pivoting means. The handle 7 has a cross-member 9 which, in closed position, is interposed between the lever systems and the locking plate 6.

The first pivoting means for the linkages comprise a first pair of lugs 10 and 11 which rise from an end portion 12 of the shaped plate 4. Mutually aligned holes 13 and 14 provided on each lug 10 and 11 define a third pivoting axis.

The second pivoting means comprise a second pair of lugs 15 and 16 which rise from an end portion 17 of the shaped plate 4 opposite to the preceding one. Mutually aligned holes 18 and 19 provided on each lug 15 and 16 define a fourth pivoting axis for the handle 7.

The linkages comprise a plate-like link 20 which has, at one of its ends, a first sleeve 21 cooperating with the holes 13 and 14 of the lugs 10 and 11 to define the third pivoting axis. The sleeve 21 engages said first pair of lugs 10 and 11, so that it can rotate, through fixing means which are constituted for example by a respective pivot 22.

In a median portion of the first plate-like element 20 a second sleeve 23 defines the first pivoting axis to which said coupling lever systems are fixed through fixing means constituted for example by the respective pin 22a.

A third sleeve 24 is located at the other end of the plate-like linkage 20 and defines the second pivoting axis about which said linkage is engaged with wing-like lugs 6a defined on the locking plate 6 through fixing means constituted for example by the respective pivot 22b.

The coupling lever systems comprise a plate-like element 25 having a pawl-shaped end portion 26 which engages the counter-shell 3 of the carryall case 1. A terminal portion 27 protrudes in a cantilevered manner from a median portion of the plate-like element 25, and bushes 29 are defined on its end; said bushes can be coupled to the second sleeve 23 by means of the respective pivot 22b.

The closure means comprise a single-key lock 30, shown in the figures with a key 31 inserted, which actuates a locking bolt 32 whose ends engage, in closure position, below the plate 4 and below the release means.

The release means comprise a button 33 which releases the fixing brackets from the motorcycle rack. The button 33 has a first projection 34 for the engagement of the locking bolt 32 and projecting sides 35 which prevent, by engaging against an inner face of a guiding seat 50, the exit of the button 33 from the opening 8.

The button 33 furthermore acts on a slider 51 biased by springs 52 and is provided with a slot 53 for removable engagement with the locking tooth 54 of a projection 55 which protrudes from the rack 56.

The snap-action release means comprise a first coiled spring 36 having ends fixed respectively to a wing 60 defined by the plate 4 proximate to the element 12 and to a projection 37 protruding from the surface of the second sleeve 23 of the plate-like linkage 20.

The snap-action release means furthermore comprise a pair of second coiled springs 38 whose ends are respectively fixed to the uprights 39 of the handle 7 and to ridges 40 of the lug 15 of the second pair of lugs 15 and 16.

The shell 2 of the carryall case 1 defines a band 41 which remains in a median position of the carryall case 1 when it is in closed position and on which it is possible to insert reflector elements or bands 42 and 43 and at least one front element 44, which may have a different color, so as to allow the combination of the colors on the case in the most appropriate manner.

The reflector bands 42 and 43 and the element 44 engage a guide 45 defined in the shell 2, and the reflector elements 42 and 43 are arranged on the band 41 in such a position as to correspond to the rear of the motorcycle.

The locking plate 6 has, on an end adjacent to the cross-member 9 of the handle 7 when it is in closed position, a groove 46 which facilitates the extraction of the handle on the part of the user.

It is furthermore possible to provide, in the shell 2, an object-carrying compartment 47 which can be taken out and removably coupled inside said shell.

Figure 2:
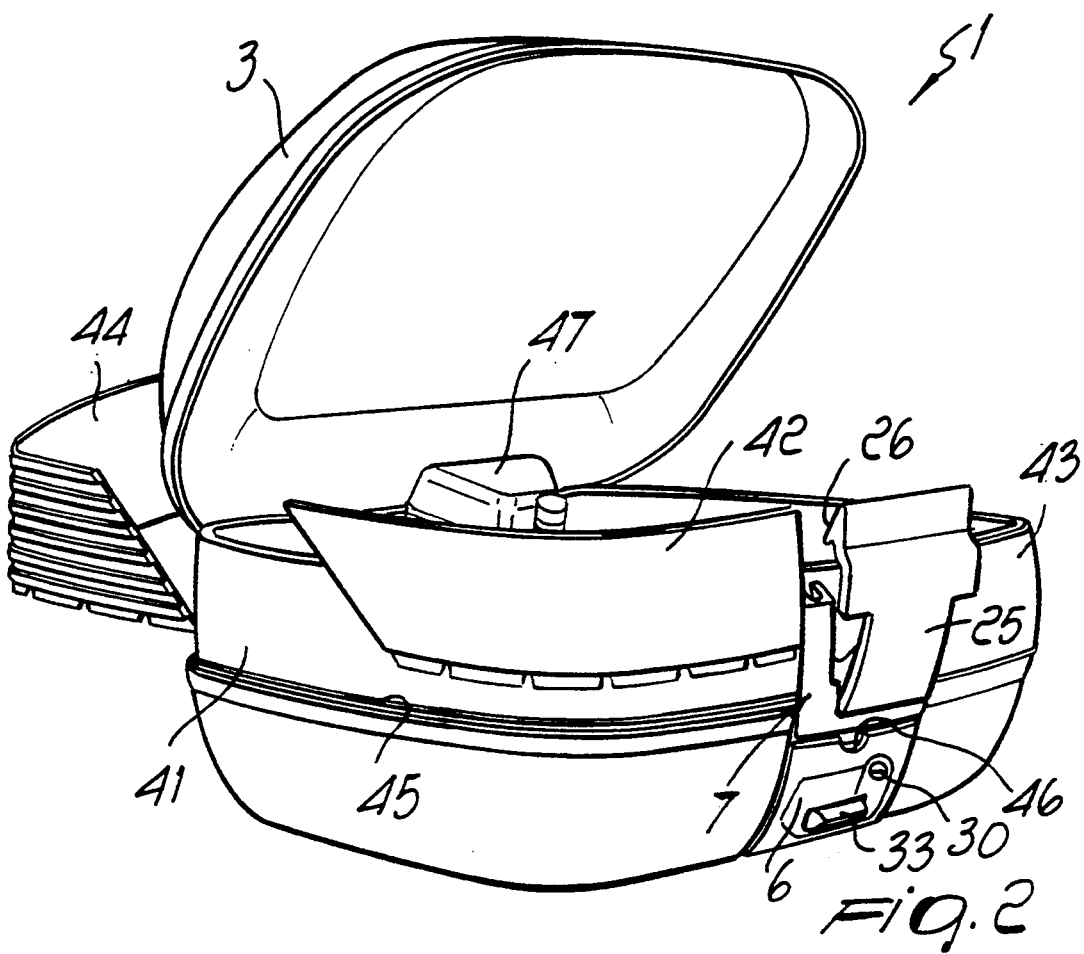
FIG. 2 is a perspective view of the carryall case in open position.

Briefly, operation is as follows: starting from the closed position, illustrated in FIGS. 1 and 3, in order to open the device it is necessary to turn the key 31 in order to rotate the locking bolt 32, thus releasing the plate-like element 25 and the button 33. In order to open the carryall case 1 it is necessary to pull the locking plate 6 out slightly, as more clearly shown in FIGS. 2 and 4, thus releasing the first coiled spring 36, which turns the linkage 20 and thus rotates and shifts the second plate-like element 25 upward and toward the outside of the case 1, releasing the pawl-shaped end 26 of the plate-like element from the counter shell 3. The closure operation is performed by carrying out the above described operations in a reverse order.

As regards the release of the carryall case 1 from the motorcycle, once the key 31 has been turned, thus freeing the button 33, it is necessary to push said button down completely in order to release, in a per se known manner, the brackets of the carryall case 1 from the rack of the motorcycle. In this case it is advantageously possible to pull out the handle 7 by acting, through the groove 46, on the cross-member 9 of said handle. In this manner the dead center of the second coiled spring 38 is passed and said second spring 38 extracts the handle from the case.

Conveniently, the handle 7 retracts flush, thus eliminating the disadvantages described earlier, and advantageously, due to the configuration of the plate-like element, it is not affected in any way by the opening or closure of said carryall case 1.

It has been observed that the present device achieves the intended aim and objects, constituting a valid improvement to the systems currently in use, advantageously improving both the aesthetics and the usefulness of carryall cases or rigid travel bags used on motorcycles, and furthermore limits the possibility of their fraudulent removal.

The device thus conceived is susceptible to numerous modifications and variations, all of which are within the scope of the inventive concept.

All the details may furthermore be replaced with other technically equivalent elements.

In practice, the materials employed, as well as the dimensions, may be any according to the requirements.

What is claimed is:

1. In combination, a case (1) having means for coupling said case (1) to a motorcycle rack, and a device for closing said case (1), said case (1) comprising;
   a shell (2) defining on a surface thereof an accommodation seat (5);
   a counter-shell (3) hingedly connected to said shell (2), said device for closing said case comprising;
   a plate (4) fixed within said accommodation seat (5);
   a linkage member (20) pivotally connected to said plate (4) by first pivoting means (10, 11, 12, 13, 21, 22);
   a plate like element (25) having a pawl-shaped portion (26) engaging said countershell (3) and connected to said linkage member (20) by second pivoting means (22a, 23, 29), and;
   a locking plate (6) having locking means (30) releasably engageable with a portion of said plate (4) and connected to said linkage member (20) by third pivoting means (6a, 22b, 24).

2. Combination according to claim 1, further comprising a handle (7, 9, 39) pivotally connected to said plate (4) by fourth pivoting means (15, 16, 18, 19) and being movable between an open position, whereat said handle (7, 9, 39) can be gripped for carrying said case, and a closed position whereat at least a portion (9) of said handle (7, 9, 39) is located within said accommodation seat (5) between said locking plate (6) and said plate-like element (25).

3. Combination according to claim 2, further comprising spring means (38) for biasing said handle (7, 39) into said closed position.

4. Combination according to claim 2, wherein said first pivoting means (10, 11) comprise lugs (10, 11) protruding from a portion (17) of said plate (4), mutually aligned holes (13, 14) provided in said lugs (10, 11), a first sleeve (21) connected to said linkage member (20), and a pivot (22) connected to said first sleeve (21) and engaging said mutually aligned holes (13, 14).

5. Combination according to claim 4, wherein said second pivoting means comprise a second sleeve (23) connected to said linkage member (20) at a median portion thereof, a terminal portion (27) protruding from said plate-like element (25), bushes (29) defined on said terminal portion (27), and a pivot (22a) pivotally interconnecting said bushes and said second sleeve (23).

6. Combination according to claim 5, wherein said third pivoting means (22b, 24) comprise a third sleeve (24) connected to said linkage member (20) at an end portion thereof remote from said first sleeve (21), wing-like lugs (6a) connected to said locking plate (6), and a pivot (22b) interconnecting said third sleeve (24) and said wing-like lugs (6a).

7. Combination according to claim 5, wherein said terminal portion (27) protrudes in a cantilevered manner from a median portion of said a locking plate (6).

8. Combination according to claim 6, wherein said second sleeve (23) is located between said first sleeve (21) and said third sleeve (24).

9. Combination according to claim 2, wherein said fourth pivoting means comprise lugs (15, 16) connected to an end portion (17) of said plate (4), and aligned holes (18, 19) formed in said lugs and defining a pivoting of said handle (7).

10. Combination according to claim 1, wherein said locking means (30) comprise a single-key lock (30) having a locking bolt (32) simultaneously engageable with a portion of said plate (4) and with a button (33) for operating means (51–53) for releasably attaching said case to a motorcycle rack (56).

11. In combination, a case (1) having means for coupling said case (1) to a motorcycle rack, and a device for closing said case (1), said case (1) comprising;
   a shell (2) defining on a surface thereof an accommodation seat (5);
   a counter-shell (3) hingedly connected to said shell (2), said device for closing said case comprising;
   a plate (4) fixed within said accommodation seat (5);
   a linkage member (20) pivotally connected to said plate (4) by first pivoting means (10, 11, 12, 13, 21, 22);
   a plate like element (25) having a pawl-shaped portion (26) engaging said countershell (3) and connected to said linkage member (20) by second pivoting means (22a, 23, 29);
   a locking plate (6) having locking means (30) releasably engageable with a portion of said plate (4) and connected to said linkage member (20) by third pivoting means (6a, 22b, 24);
   a handle (7, 9, 39) pivotally connected to said plate (4) by fourth pivoting means (15, 16, 18, 19) and being movable between an open position, whereat said handle (7, 9, 39) can be gripped for carrying said case, and a closed position whereat at least a portion (9) of said handle (7, 9, 39) is located within said accommodation seat (5).

12. Combination according to claim 11, further comprising spring means (38) for biasing said handle (7, 39) into said closed position.

13. Combination according to claim 11, wherein said first pivoting means (10, 11) comprise lugs (10, 11) protruding from a portion (17) of said plate (4), mutually aligned holes (13, 14) provided in said lugs (10, 11), a first sleeve (21) connected to said linkage member (20), and a pivot (22) connected to said first sleeve (21) and engaging said mutually aligned holes (13, 14).

14. Combination according to claim 13, wherein said second pivoting means comprise a second sleeve (23) connected to said linkage member (20) at a median portion thereof, a terminal portion (27) protruding from said plate-like element (25), bushes (29) defined on said terminal portion (27), and a pivot (22a) pivotally interconnecting said bushes and said second sleeve (23).

15. Combination according to claim 14, wherein said third pivoting means (22b, 24) comprise a third sleeve (24) connected to said linkage member (20) at an end portion thereof remote from said first sleeve (21), wing-like lugs (6a) connected to said locking plate (6), and a pivot (22b) interconnecting said third sleeve (24) and said lugs (6a).

16. Combination according to claim 14, wherein said terminal portion (27) protrudes in a cantilevered manner from a median portion of said a locking plate (6).

17. Combination according to claim 15, wherein said second sleeve (23) is located between said first sleeve (21) and said third sleeve (24).

18. Combination according to claim 11, wherein said fourth pivoting means comprise lugs (15, 16) connected to an end portion (17) of said plate (4), and aligned holes (18, 19) formed in said lugs and defining a pivoting of said handle (7).

19. Combination according to claim 11, wherein said portion (9) of said handle (7, 9, 39) is located within said accommodation seat (5) between said locking plate (6) and said plate-like element (25).

20. In combination, a case (1) having means for coupling said case (1) to a motorcycle rack, and a device for closing said case (1), said case (1) comprising;
   a shell (2) defining on a surface thereof an accommodation seat (5);
   a counter-shell (3) hingedly connected to said shell (2), said device for closing said case comprising;
   a plate (4) fixed within said accommodation seat (5);
   a linkage member (20) pivotally connected to said plate (4) by first pivoting means (10, 11, 12, 13, 21, 22);
   a plate like element (25) having a pawl-shaped portion (26) engaging said countershell (3) and connected to said linkage member (20) by second pivoting means (22a, 23, 29);
   a locking plate (6) having locking means (30) releasably engageable with a portion of said plate (4) and connected to said linkage member (20) by third pivoting means (6a, 22b, 24);
   wherein said first pivoting means (10, 11) comprise lugs (10, 11) protruding from a portion (17) of said plate (4), a first sleeve (21) connected to said linkage member (20), and a pivot (22) connected to said first sleeve (21) and engaging lugs (10, 11);
   wherein said second pivoting means comprise a second sleeve (23) connected to said linkage member (20) at a median portion thereof, a terminal portion (27) protruding from said plate-like element (25), bushes (29) defined on said terminal portion (27), and a pivot (22a) pivotally interconnecting said bushes and said second sleeve (23), and;
   wherein said third pivoting means (22b, 24) comprise a third sleeve (24) connected to said linkage member (20), wing-like lugs (6a) connected to said locking plate (6), and a pivot (22b) interconnecting said third sleeve (24) and said wing-like lugs (6a).

* * * * *

UNITED STATES PATENT AND TRADEMARK OFFICE
CERTIFICATE OF CORRECTION

PATENT NO. : 5,351,509
DATED : October 4, 1994
INVENTOR(S) : Giuseppe Visenzi

It is certified that error appears in the above-indentified patent and that said Letters Patent is hereby corrected as shown below:

On the title page, item [76] Inventor: please change "Guiseppe" to --Giuseppe--.

Signed and Sealed this

Third Day of January, 1995

Attest:

BRUCE LEHMAN

*Attesting Officer*  *Commissioner of Patents and Trademarks*